United States Patent [19]
De Meringo et al.

[11] Patent Number: 5,952,254
[45] Date of Patent: Sep. 14, 1999

[54] MINERAL WOOL COMPOSITION

[75] Inventors: Alain De Meringo; Fabrice Lafon, both of Paris; Jean-Luc Bernard, Clermont; Veronique Renous Chan, Paris, all of France

[73] Assignee: Isover Saint-Gobain, Courbevoie, France

[21] Appl. No.: 09/096,891

[22] Filed: Jun. 12, 1998

Related U.S. Application Data

[60] Provisional application No. 60/054,539, Aug. 4, 1997.

[30] Foreign Application Priority Data

Jun. 17, 1997 [FR] France ................................. 97 07523

[51] Int. Cl.$^6$ ........................ C03C 13/00; C03C 13/06
[52] U.S. Cl. ........................ 501/36; 501/35; 501/38; 428/374; 428/392
[58] Field of Search ........................ 501/35, 36, 63, 501/65, 66, 70, 16, 72, 69, 38; 428/374, 392, 369

[56] References Cited

U.S. PATENT DOCUMENTS

| | | | |
|---|---|---|---|
| 5,576,252 | 11/1996 | Rapp et al. | 501/36 |
| 5,616,525 | 4/1997 | Rapp et al. | 501/36 |
| 5,622,903 | 4/1997 | Rapp et al. | 501/35 |
| 5,723,216 | 3/1998 | Houpt et al. | 501/35 |

*Primary Examiner*—Michael Marcheschi
*Attorney, Agent, or Firm*—David Bennett

[57] ABSTRACT

The invention relates to "two-component" inorganic fibers obtained by conjoint fiber formation from two different inorganic compositions, especially two glass compositions based on $SiO_2$, alkali metal oxides and alkaline-earth metal oxides;

the two inorganic compositions have thermal expansion coefficients α exhibiting a difference Δα of at least $20 \times 10^7 K^{-1}$, they have a minimum viscosity temperature of fiber formation $T_{log3}$ of between 830 and 1010° C., they exhibit a work range of at least 30° C., each includes, as weight percentages, in all less than 3% of the following compounds: $TiO_2$, $ZnO$, $BaO$ and $Li_2O$ and preferably less than 1% of each of these, they exhibit, as weight percentages, differences in respective contents of boron oxides $B_2O_3$ and of sodium oxide $Na_2O$ such that:

(i) $\Delta B_2O_3 > 2\%$ (ii) $\Delta Na_2O > 2\%$.

11 Claims, No Drawings

MINERAL WOOL COMPOSITION

This application claims the benefit of U.S. Provisional Application No. 60/054,539 Aug. 4, 1997.

The present invention relates to the field of artificial mineral wools. It concerns more precisely the mineral wools intended for the manufacture of materials for thermal and/or sound insulation or substrates for soilless cultivation, and especially those commonly referred to by the term of glass wool.

Mineral wools of glass wool type with which the invention is concerned are generally obtained by so-called internal centrifuging processes of fibre formation, consisting, in outline, in pouring the vitrifiable raw materials, once they are molten, inside centrifuges (spinner) whose peripheral wall is pierced with a large number of orifices from which the molten mass is thrown forward in the form of filaments which are entrained and drawn into fibres by a gas stream at high temperature and speed at the periphery of the centrifuges.

An adaptation of the internal centrifuging technique described above has been developed, an adaptation consisting, again in very rough outline, in feeding each of the orifices of the fibre-forming spinner with two glass threads exhibiting different chemical compositions. Since the glass compositions are chosen so as to have different heat expansion coefficients $\alpha$, the fibres obtained are found to be "two-component" fibres which, on cooling, exhibit a high flexibility and a "curvilinear" appearance giving the final product a particularly aerated, particularly "blown" or <<puffed>> appearance with a high recovery of thickness after compression. Reference may be made, for example, to patents U.S. Pat. No. 2,998,620, WO-95/12554 and WO-96/34837.

Investigations have also been conducted in order to develop the most judicious "pairs" of glass compositions, to obtain the property sought after.

Thus, the abovementioned patent application WO-95/12554 describes combinations of two types of glass compositions in which the difference between the thermal expansion coefficients is at least $20 \times 10^{-7} K^{-1}$. However, the two types of compositions adopted have a temperature corresponding to a viscosity in poises equal to log 3 which is between 1010° C. and 1121° C. In concrete terms, this temperature, called $T_{log3}$, is for a person skilled in the art an indication of the temperature of minimum viscosity for fibre formation. Now, the above temperature range 1010–1121° C. is particularly high, and this is not free from disadvantage in terms of fibre formation: in particular it involves high energy expenditure for melting the raw materials and a risk of premature corrosion of the fibre-forming spinners.

The abovementioned patent application WO-96/34837, in its turn, has chosen especially to add oxides of $Li_2O$, $ZnO$, $BaO$ or $TiO_2$ type to the compositions in order to modify their thermal expansion coefficients as well as possible, or else to employ particularly high boron oxide ratios for the compositions with the lowest thermal expansion coefficient. However, in both cases, these choices result in an appreciable increase in the costs of raw materials.

The aim of the invention is to overcome these disadvantages, especially by developing new combinations of inorganic compositions which are capable, once conjointly formed into fibres, of exhibiting the wavy appearance sought after, by virtue of a sufficient difference between their respective thermal expansion coefficients. However, the invention also seeks to make the production of such fibres feasible, industrially and economically, and especially not expensive in terms of yield, of costs of production tools, of energy costs or of raw materials.

The subject-matter of the invention is therefore "two-component" inorganic fibres obtained by conjoint fibre formation from two different inorganic compositions, especially two glass compositions based on $SiO_2$, alkali metal oxides and alkaline-earth metal oxides. They are defined by the following characteristics:

a)—the two inorganic compositions have thermal expansion coefficients $\alpha$ exhibiting a difference $\Delta\alpha$ of at least $20 \times 10^{-7} K^{-1}$ between the composition "of highest $\alpha$" and the composition "of lowest $\alpha$", and especially of at least $30 \times 10^{-7}$ and even $40 \times 10^{-7} K^{-1}$, b)—the two inorganic compositions have a minimum viscosity temperature $T_{log3}$ of between 830 and 1010° C., c)—the two inorganic compositions exhibit a work range defined by the difference between the temperature of minimum viscosity for fibre formation and the liquidus temperature, of at least 30° C., especially of at least 40° C., d)—each of the two inorganic compositions includes, as weight percentages, in all less than 3% of the following compounds: $TiO_2$, $ZnO$, $BaO$ and $Li_2O$, and preferably less than 1% of each of these, e)—the two compositions exhibit, as weight percentages, differences in respective contents of boron oxides $B_2O_3$ and of sodium oxide $Na_2O$ such that:

$$\Delta B_2O_3 > 2\% \quad \text{(i)}$$

$$\Delta Na_2O > 2\%. \quad \text{(ii)}$$

According to the invention there is in addition preferably the following relationship:

$$0 \leq |\Delta Na_2O - \Delta B_2O_3| \leq 5. \quad \text{(iii)}$$

In the context of the invention "$\Delta B_2O_3$" in relationship (i) is intended to mean the difference between the $B_2O_3$ content, as weight percentage, of the composition "of lowest $\alpha$" and the $B_2O_3$ content, as weight percentage, of the composition "with highest $\alpha$".

Similarly, $\Delta Na_2O$ in the relationship (ii) is intended to mean the difference between the $Na_2O$ content, as weight percentage, of the composition "of highest $\alpha$" and the $Na_2O$ content, as weight percentage, of the composition "of lowest $\alpha$".

In the relationship (iii), it is indeed the absolute value of the difference $\Delta Na_2O - \Delta B_2O_3$ that is considered: here, the difference can, in fact, correspond to a positive or negative value. Furthermore, the $T_{log3}$ temperature value corresponds to the temperature at which the composition(s) considered is (are) at a viscosity, expressed in poises, corresponding to log 3.

In the light of all the characteristics stated above, the invention has in fact achieved a judicious compromise between the various properties sought after for this quite special type of fibre.

Thus, the characteristic a) guarantees that wavy fibres, and hence the mineral wool exhibiting the "swollen, puffy >> aspect which is particularly advantageous from the thermal and mechanical viewpoint, will actually be obtained. In fact, a minimum difference of $20 \times 10^{-7} K^{-1}$ between the two thermal expansion coefficients is necessary. A $\Delta\alpha$ of the order of 30 or even 40 to $50 \times 10^{-7} K^{-1}$ is preferably rather chosen.

The characteristic b) specifies a range of $T_{log\ 3}$ temperature values which are advantageous because they lie below 1010° C. and are rather included between 850 and 1010° C., and especially of at least 860° C., or even optionally of at least 890° C., that is to say temperatures which are relatively not very high, which is obviously very highly advantageous, both in terms of the cost of energy of fibre formation and of production tools. In fact, the centrifuging spinners are thus found not to be too highly stressed thermally and wear normally without having to resort to expensive materials suited to the high temperatures. The $T_{log3}$ values of the two compositions are preferably near each other, advantageously with a difference of at most 30° C., especially of at most 25° C., more particularly of at most 20° C., to guarantee an optimum compatibility of their fibre-forming conditions.

The characteristic c) is a work range defined above, sufficiently broad to permit fibre formation in standard conditions, this range is preferably at least 40° C., and even advantageously above 50° C.

The characteristic d) tends to limit the cost connected with the raw materials: in fact, the invention makes it possible to obtain fibres with the property sought after, without having to resort to components in quantities such that their cost would overload the profitability of the manufacture.

The characteristic e) of the invention puts forward the relationships (i) land (ii) between the $Na_2O$ and $B_2O_3$ contents of the two compositions. The invention have shown, in fact, that sodium oxide and boron oxide has an influence on the thermal expansion coefficient $\alpha$ in similar proportions but opposite directions, sodium oxide tending to increase the coefficient $\alpha$ whereas boron oxide tends to decrease it. Rather than add very special oxides in order to influence the coefficient $\alpha$, oxides which have only this effect and which are generally very expensive, like $Li_2O$ or ZnO, the invention has therefore been based on compositions with customary constituents: sodium oxide and boron oxide are well-known components for adjusting the viscosity of the composition, being included among the fluxes and/or lattice-modifiers in the inorganic composition. The invention therefore assigns to them a second function, that of "regulators" of the coefficient $\alpha$, so as to obtain the desired difference in coefficient $\alpha$ between the two compositions.

What is astonishing, furthermore, is that this "second function" has therefore led to the selection of the minimum differences between $Na_2O$ and $B_2O_3$ contents, defined by the relationships (i) and (ii), without these adjustments to $Na_2O$ and $B_2O_3$ contents coming to perturb their original function. It has thus been possible to maintain, in parallel, $T_{log3}$ and liquidus temperature values which are wholly suited to the standard conditions of fibre formation by internal centrifuging. It might have been expected that, on the contrary, such adjustments would have unforeseen consequences on the "fibre-formability" of the compositions. In fact, within the scope of the invention it is possible to "allow oneself" to choose two compositions whose sodium oxide and boron oxide contents remain within proportions that are not necessarily unusual, since the reasoning is based on differences.

It should be noted that the invention emphasizes chiefly $Na_2O$ as an agent capable of increasing the coefficient $\alpha$, but that other alkali metal oxides can play this part, very particularly $K_2O$. In fact, it is preferred in the invention to employ little or no $K_2O$, generally at most 10%, especially at most 8% or 5% or 3%, because this originates from a raw material which tends to be slightly more expensive than $Na_2O$. If all the alkali metal oxides are expressed as $R_2O$, it is then preferred in the invention to choose the ratio of the weight percentages $Na_2O/R_2O$ which is relatively high. Without departing from the invention it is possible to consider in the relationship (ii) not $Na_2O$, but, in fact the sum $(Na_2O+K_2O)$.

It should also be noted that the optional relationship (iii) "expresses" the fact referred to above, that these two oxides have an influence which is opposite but in similar proportions. From the composition "of high $\alpha$" to the composition of "low $\alpha$" the "deficiency" of "boron oxide" is thus found to be "compensated" at least partially, by an "excess" of sodium oxide and vice versa.

It may be emphasized that, even in the composition "of low $\alpha$", which is therefore found to be that richer in $B_2O_3$ of the two, according to the invention it is preferred to limit the boron oxide content to at most 20% by weight, since an excessive proportion of boron oxide could turn out to be disadvantageous in terms of cost of raw materials in particular.

According to an embodiment of the invention at least one of the inorganic compositions includes, as weight percentage, at least 0.5 to 1% of aluminium oxide. While this does not appear to have a significant influence on the expansion coefficient $\alpha$, on the other hand providing it in a certain quantity tends to improve the durability of the fibres, especially with regard to water attack or to high temperature. It may be preferable, nevertheless, to limit its content to at most 3.5% by weight.

According to another embodiment of the invention, compatible, of course, with the preceding one, at least one of the two compositions includes, as weight percentage, from 0 to 3% of $P_2O_5$, especially either 0% of $P_2O_5$ or from 0.1 or alternatively from 0.5 to 2% of $P_2O_5$. This constituent may fulfil an advantageous function: it is known, in fact, that it tends to have a positive influence on the biodegradability of the fibres, which is tested by suspending in a buffered medium simulating a physiological medium, without very significantly altering the thermal expansion coefficient $\alpha$. There is therefore an advantage in resorting to it in the compositions. A maximum proportion of 3 or 2% is preferable, in order not to overload the raw material costs.

According to another embodiment, still compatible with the preceding ones, at least one of the compositions may comprise at most 3% of $K_2O$ and, preferably, between 0 and 2% of this oxide. In fact, $K_2O$ acts as a flux, like $Na_2O$, and tends to increase the coefficient $\alpha$, as explained above. It is nevertheless preferable to limit its content by keeping the sum of the alkali metal oxide contents of each of the two compositions constant, because potassium oxide tends to be more costly than sodium oxide.

According to another alternative form, compatible with the preceding ones, at least one of the compositions may contain from 0 to 3% by weight of $Fe_2O_3$ (total iron expressed in this form) and/or may contain up to 3% by weight of fluorine.

According to another alternative form, compatible with all those above, at least one of the compositions may contain less than 3% by weight of BaO.

The invention defines below four major types of inorganic compositions of glass type, labelled A, B, C and D and classified according to a decreasing thermal expansion coefficient $\alpha$. The most advantageous combinations between two compositions belonging to different types will be made explicit in what follows. In each of these classes, and in all the compositions exemplified in what follows, it is to be understood that these compositions may optionally contain elements/oxides other than those explicitly mentioned. This may especially involve optional elements/compounds referred to above, of the $P_2O_5$ and $Fe_2O_3$ type. A person skilled in the art of the field of glass-manufacturing compositions is aware, furthermore, that the latter may also comprise, without any limitation being implied, a certain content of impurities, generally at most 2% by weight.

The first class of compositions is so-called of type A. It has a thermal expansion coefficient α of between 110 and $140 \times 10^{-7}$ K$^{-1}$, and includes sodium oxide, boron oxide and optionally K$_2$O in the following proportions, as weight percentage:

B$_2$O$_3$≦7%, preferably lower than 5%, especially from 0 to 4% or 0 to 3%,
Na$_2$O≧18%, preferably from 19 to 25%,
Na$_2$O+B$_2$O$_3$+K$_2$O between 18 and 33%, especially between 22 and 30%.

This sum (Na$_2$O+B$_2$O$_3$+K$_2$O) is an advantageous index of the overall cost of raw materials needed for the formulation. It can be considered, in fact, that in the compositions according to the invention, the chief constituents of which are the standard constituents of glass compositions, it is sodium oxide and boron oxide which, by the quantities employed and their price, define a significant part of the overall cost of the composition. Another important point is that this sum (Na$_2$O+B$_2$O$_3$+K$_2$O) plays a great part in determining the T$_{log3}$ value of the composition.

The composition of type A preferably includes the following compounds, as weight percentages:

| | |
|---|---|
| SiO$_2$ | 46 to 62%, preferably 48 to 60% |
| Na$_2$O | 18 to 26%, preferably 19 to 25% |
| B$_2$O$_3$ | 0 to 7%, preferably 0 to 4% |
| Al$_2$O$_3$ | 0 to 8%, preferably 0 to 5% |
| K$_2$O | 0 to 8%, preferably 1 to 4% |
| CaO | 6 to 13%, preferably 7 to 12% |
| MgO | 0 to 5%, preferably 0 to 3% |
| P$_2$O$_5$ | 0 to 3%. |

This series is of interest in the sense that it is aimed at compositions of high or even very high coefficient α since, in the case of some of the examples 1A–18A which illustrate this class in the text that follows, the coefficient α exceeds $130 \times 10^{-7}$ K$^{-1}$.

All the compositions in this class have two points in common: a high proportion of alkali metal oxides and very particularly of sodium oxide, and a low, or even nil proportion of boron oxide.

It is next possible to distinguish several "subgroups" in this class, according to various criteria linked with their compositions.

Thus, some have a significant proportion of aluminium oxide, of the order of 5 to 8%, whereas others have a much lower or even virtually nil proportion of aluminium oxide, of the order of 0.5 to 3%. Aluminium oxide tends to increase the durability of the fibres, it being possible nevertheless for too high a proportion not to be desirable because of other considerations; the invention therefore allows a wide choice in the proportion of alumina, while keeping the values of α and of T$_{log3}$ within similar values, which can be ascertained especially from the comparison of Examples 11A and 16A, or 14A and 16A, detailed below.

Compositions which have P$_2$O$_5$, especially between 0.5 and 2%, can also be distinguished from those that do not have it. In fact, the presence of P$_2$O$_5$ can improve the biodegradability of the fibres, especially if it relates to compositions in which the proportion of alumina is significant.

It is also possible to distinguish the compositions which have boron oxide, especially in modest proportions of the order of 1 to 3%, from those which are devoid of it.

Where the adjustment of the coefficient α is concerned, it is, in fact, advantageous here to introduce little or no B$_2$O$_3$, since it tends to lower this coefficient. Its presence in these compositions "of high α" can nevertheless be justified by its original function of a flux.

The second class of compositions is so-called of type B. It has a thermal expansion coefficient α of between 100 and $109 \times 10^{-7}$ K$^{-1}$, and it includes sodium oxide and boron oxide, and optionally potassium oxide in the following proportions, as weight percentage:

B$_2$O$_3$≧3%, preferably≧4% and especially from 4 to 7%,
Na$_2$O≦22%, preferably≦20%, especially between 16 and 20%,
Na$_2$O+B$_2$O$_3$+K$_2$O between 15 and 28%, especially between 18 and 25%.

The composition B preferably includes the following compounds, as weight percentages:

| | |
|---|---|
| SiO$_2$ | 56 to 65%, preferably 58 to 62% |
| Na$_2$O | 15 to 22%, preferably 16 to 20% |
| K$_2$O | 0 to 3%, preferably 1 to 2.5% |
| B$_2$O$_3$ | 3 to 10%, preferably 4 to 8% |
| Al$_2$O$_3$ | 0 to 3%, preferably 1 to 2.5% |
| CaO | 6 to 10%, preferably 7 to 9% |
| MgO | 0 to 5%, preferably 1 to 4.5% |
| P$_2$O$_5$ | 0 to 3%. |

It is seen that this time it is a minimum proportion of boron oxide that is imposed and, on the contrary, a maximum proportion of sodium oxide. What is again involved is rather a composition "of high α" type (although it is not ruled out that it may be made to act as a composition "of lower α", for example in combination with a composition of type A), but it is aimed at a range of lower coefficients α.

This involves a class of compositions which are somewhat intermediate between the compositions of very high α referred to above and the compositions of very low α described later under the heading of class of type D. The proportion of Na$_2$O tends to be slightly less high than in class A and, on the other hand, the presence of B$_2$O$_3$ is required. The sum (Na$_2$O+B$_2$O$_3$+K$_2$O) also tends to be less high than in class A.

The third class of compositions is so-called of type C. It has a thermal expansion coefficient α of between 76 and $99 \times 10^{-7}$ K$^{-1}$ and it includes sodium oxide, boron oxide, and optionally potassium oxide in the following proportions, as weight percentage:

B$_2$O$_3$>10%, preferably>11% and especially between 11 and 16%,
Na$_2$O≦18%, preferably from 15 to 18%
Na$_2$O+B$_2$O$_3$+K$_2$O between 22 and 33%, especially 25 and 30%.

It preferably includes the following compounds, as weight percentages:

| | |
|---|---|
| SiO$_2$ | 52 to 64%, preferably 55 to 63% |
| Na$_2$O | 13 to 18%, preferably 14 to 18% |
| K$_2$O | 0 to 2%, preferably 0 to 1% |
| B$_2$O$_3$ | 10 to 15%, preferably 11 to 15% |
| Al$_2$O$_3$ | 0 to 4%, preferably 0.5 to 2% |
| CaO | 4 to 10%, preferably 4 to 8% |
| MgO | 1 to 6%, preferably 3 to 5% |
| P$_2$O$_5$ | 0 to 3%, especially 0 to 2%. |

As in the case of class B, this class of compositions is therefore somewhat intermediate in terms of coefficient α. The compositions of this class preferably act as "compositions of lower α", although it is not excluded from the invention that they may act as a "composition of higher α" in combination with a composition with a still lower value of α.

The compositions of class C tend to be richer in B$_2$O$_3$ and less rich in sodium oxides than those of class B. The sum $Na_2O+B_2O_3+K_2O$ tends overall to be less high, because the increase in proportion of $B_2O_3$ tends to be generally more important than the decrease in the proportion of $Na_2O$ (and/or $K_2O$).

The fourth class of compositions is so-called of type D. It has a thermal expansion coefficient α of between 60 and $75 \times 10^{-7}$ $K^{-1}$. It includes sodium oxide, boron oxide, and optionally potassium oxide in the following proportions, as weight percentage:

$Na_2O \leq 13\%$, a especially between 8 and 13% or between 9 and 12%, $B_2O_3 \geq 13\%$, especially between 14 and 21% or between 15 and 19%

$Na_2O+B_2O_3+K_2O$ between 21 and 32%, especially between 25 and 30%.

The inorganic composition "D" preferably includes the following compounds, as weight percentages:

| | |
|---|---|
| $SiO_2$ | 53 to 62%, preferably 55 to 60% |
| $Na_2O$ | 8 to 15%, preferably 9 to 13% |
| $K_2O$ | 0 to 3%, preferably 0 to 1% |
| $B_2O_3$ | 13 to 22%, preferably 15 to 19% |
| $Al_2O_3$ | 0 to 3%, preferably 0.5 to 2% |
| CaO | 4 to 10%, preferably 4 to 7% |
| MgO | 1 to 9%, preferably 3 to 8% |
| $P_2O_5$ | 0 to 3%. |

This class of compositions is therefore aimed at very low coefficients α, which are to a large extent linked with a high proportion of boron oxide and a relatively moderate proportion of sodium oxide. It is therefore employed in the invention as a composition "of lower α". The sum ($Na_2O+B_2O_3+K_2O$) of this class of compositions does not differ appreciably from that of class C or of class A in particular.

This class of compositions can be divided up into various subgroups. Some of these compositions may thus contain $P_2O_5$ and others not. Similarly, some of these compositions may contain little or no alumina (0 to 0.5% by weight) or a more significant content, for example of the order of 1 to 2 or 3%. Similarly, in this class there is a tendency to prefer employing a fairly constant CaO content of the order of 3 to 8%. On the other hand, it may be found advantageous to modify more widely the proportion of MgO, which may, for example be either also of the order of 3 to 5%, so as to have an MgO/CaO ratio of the order of 1, or be of the order of 7 to 9%, so as to have an MgO/CaO ratio rather of the order of 2, and so additionally to have a higher overall content of alkaline-earth metal oxides, generally accompanied by a lower $SiO_2$ content.

The fibres according to the invention therefore combine two compositions belonging to two different "types". Four combinations are found to be very particularly advantageous.

The first consists in combining a composition of type "A" as a composition "of higher α" with a composition of type "C" as a composition "of lower α", preferably with:
(i) Δ $B_2O_3 \geq 3\%$, especially>7%, preferably between 8 and 15%,
(ii) Δ $Na_2O \geq 4\%$, especially$\geq 5\%$, preferably between 5 and 11%.

The second consists in combining a composition of type "B" as a composition "of higher α" with a composition of type "D" as a composition "of lower α", preferably with:
(i) Δ $B_2O_3 \geq 3\%$, especially$\geq 7\%$, preferably between 8 and 14%,
(ii) Δ $Na_2O \geq 2\%$, especially$\geq 6\%$, preferably between 7 and 10%.

The third consists in combining a composition of type "A" as a composition "of higher α" with a composition of type "D" as a composition "of lower α", preferably with:

(i) Δ $B_2O_3 \geq 5\%$, especially$\geq 9\%$, preferably between 10 and 19%,
(ii) Δ$Na_2O \geq 5\%$, especially$\geq 8\%$, preferably between 8 and 15%.

The fourth consists in combining a composition of type C as a composition "of higher α" with a composition of type D as a composition "of lower α", preferably with:
(i) Δ $B_2O_3 \geq 3\%$, especially$\geq 6\%$, preferably between 6 and 9%,
(ii) Δ $Na_2O \geq 3\%$, especially$\geq 6\%$, preferably between 6 and 10%.

It is also possible to envisage combining a composition of type A as a composition "of higher α" with a composition of type B as a composition "of lower α", preferably with:
(i) Δ $B_2O_3 \geq 2\%$, preferably$\geq 3\%$ up to 8%,
(ii) Δ $Na_2O \geq 4\%$, preferably$\geq 5\%$, especially between 6 and 8%.

The fibres of the invention, as described above, can be applied to the manufacture of materials for thermal and/or sound insulation and also to the manufacture of substrates for soilless cultivation.

The invention will be described in greater detail below with the aid of examples of embodiment, no limitation being implied thereby.

All the mineral wools described below are obtained by internal centrifuging, the technique of which has been adapted to permit the joint formation of fibres of two compositions.

In accordance with this "conjoint" internal centrifuging technique, described especially in U.S. Pat. No. 2,998,620, a fibre-forming spinner is fed continuously with a thread of molten glass exhibiting a given first composition and with a thread of molten glass exhibiting a second composition. These compositions are chosen according to the invention so as to exhibit significantly different coefficients α. Under the effect of the centrifugal force and of the suitable design of the orifices with which the spinner is provided, two-component filaments are ejected from the orifices and then drawn with the aid of an annular burner generating a crown ring of hot gas under the spinner. The fibres thus formed are next optionally impregnated with a sizing composition, with annular blowing members next guiding the optionally sized fibres onto a suction conveyor belt the speed of which will make it possible to adjust the weight per unit area of the final product. The sheet thus formed is taken into an oven at 200° C. equipped with lower and upper endless forming belts (which allows the resin of the sizing composition to crosslink, if one has been employed), and to form the sheet of the desired thickness and hence of the desired density.

The four tables below group together examples of compositions according to the four large classes of compositions A to D detailed above:
Table 1: Compositions of type A, Examples 1A to 18A,
Table 2: Compositions of type B, Examples 1B to 8B,
Table 3: Compositions of type C, Examples 1C to 12C,
Table 4: Compositions of type D, Examples 1D to 13D.

Each of these tables shows: the compositions of the examples and their $T_{log3}$ and $T_{liq}$ temperatures in ° C. and their thermal expansion coefficients α in $K^{-1}$.

$Fe_2O_3$ should be understood as taking into account all of the iron oxides in the composition, in a way which is accepted in this field.

In all these examples the contents are to be understood as weight percentages. When the sum of all the contents of all the compounds is slightly lower than 100%, it should be understood that the residual proportion corresponds to the impurities and/or minor components which are not analysed (for example traces of $Fe_2O_3$, of $TiO_2$, of $SO_3$, etc.). If, on the other hand, it is slightly more than 100%, the reason is the permitted tolerances of the analyses in this field.

TABLE 1

| COMPOSITION "A" | | | | | | | | | |
|---|---|---|---|---|---|---|---|---|---|
| | EX. 1A | EX. 2A | EX. 3A | EX. 4A | EX. 5A | EX. 6A | EX. 7A | EX. 8A | EX. 9A |
| $SiO_2$ | 56.52 | 53.48 | 54.64 | 51.5 | 56 | 54.5 | 56 | 50.5 | 53.5 |
| $Al_2O_3$ | 4.7 | 4.6 | 4.65 | 7 | 6.5 | 7 | 4.5 | 7 | 7 |
| CaO | 7 | 7 | 7 | 9 | 9 | 8 | 9 | 9 | 9 |
| MgO | 2.1 | 2.05 | 2.1 | 2.5 | 2.5 | 2.5 | 2.5 | 2.5 | 2.5 |
| $Na_2O$ | 21.9 | 22 | 21.9 | 25 | 19 | 23 | 23 | 25 | 23 |
| $K_2O$ | 1.1 | 1.1 | 1.1 | 2 | 2 | 2 | 2 | 2 | 2 |
| $B_2O_3$ | 5.8 | 5.8 | 5.9 | 3 | 5 | 3 | 3 | 4 | 3 |
| $Fe_2O_3$ | — | 1.4 | 0.16 | — | — | — | — | — | — |
| F | 0.75 | 0.75 | 0.7 | — | — | — | — | — | — |
| NiO | 0.01 | 1 | 1 | — | — | — | — | — | — |
| CoO | — | 0.85 | 0.85 | — | — | — | — | — | — |
| $P_2O_5$ | 0.05 | 0.03 | 0.03 | 0 | 0 | 0 | 0 | 0 | 0 |
| TOTAL | 99.93 | 100.06 | 100.03 | 100 | 100 | 100 | 100 | 100 | 100 |
| $T_{log3}$ | 937 | 896 | 907 | 902 | 978 | 948 | 937 | 889 | 937 |
| $T_{liq}$ | 860 | 860 | 870 | — | — | — | — | — | — |
| $\alpha$ | $117 \times 10^{-7}$ | $117 \times 10^{-7}$ | $116 \times 10^{-7}$ | $131 \times 10^{-7}$ | $110 \times 10^{-7}$ | $123 \times 10^{-7}$ | $123 \times 10^{-7}$ | $131 \times 10^{-7}$ | $124 \times 10^{-7}$ |

| COMPOSITION "A" | | | | | | | | | |
|---|---|---|---|---|---|---|---|---|---|
| | EX. 10A | EX. 11A | EX. 12A | EX. 13A | EX. 14A | EX. 15A | EX. 16A | EX. 17A | EX. 18A |
| $SiO_2$ | 53 | 50 | 51 | 51 | 51 | 54.5 | 55 | 58.5 | 60 |
| $Al_2O_3$ | 8 | 7 | 8 | 7 | 8 | 1.5 | 0.5 | 2.5 | 2.5 |
| CaO | 12 | 12 | 12 | 12 | 10 | 12 | 12 | 12 | 12 |
| MgO | 2 | 2 | 2 | 2 | 2 | 2 | 2.5 | 2 | 2.5 |
| $Na_2O$ | 22 | 25 | 25 | 25 | 25 | 25 | 25 | 22 | 22 |
| $K_2O$ | 3 | 2 | 2 | 3 | 3 | 3 | 3 | 0 | 0 |
| $B_2O_3$ | 0 | 0 | 0 | 0 | 0 | 0 | 0 | 1 | 1 |
| $Fe_2O_3$ | — | — | — | — | — | — | — | — | — |
| F | — | — | — | — | — | — | — | — | — |
| NiO | — | — | — | — | — | — | — | — | — |
| CoO | — | — | — | — | — | — | — | — | — |
| $P_2O_5$ | 0 | 2 | 0 | 0 | 1 | 2 | 2 | 2 | 0 |
| TOTAL | 100 | 100 | 100 | 100 | 100 | 100 | 100 | 100 | 100 |
| $T_{log3}$ | 951 | 913 | 913 | 900 | 923 | 900 | 895 | 948 | 943 |
| $T_{liq}$ | — | — | — | — | — | — | — | — | — |
| $\alpha$ | $128 \times 10^{-7}$ | $138 \times 10^{-7}$ | $137 \times 10^{-7}$ | $138 \times 10^{-7}$ | $137 \times 10^{-7}$ | $135 \times 10^{-7}$ | $134 \times 10^{-7}$ | $122 \times 10^{-7}$ | $120 \times 10^{-7}$ |

TABLE 2

| COMPOSITION "B" | | | | | | | | |
|---|---|---|---|---|---|---|---|---|
| | EX. 1B | EX. 2B | EX. 3B | EX. 4B | EX. 5B | EX. 6B | EX. 7B | EX. 8B |
| $SiO_2$ | 58 | 60 | 59.5 | 59.5 | 59 | 58 | 61 | 61.8 |
| $Al_2O_3$ | 2.5 | 2 | 2.5 | 1 | 2.5 | 2.5 | 7 | 2.5 |
| CaO | 9 | 9 | 9 | 9 | 9 | 9 | 9 | 6.9 |
| MgO | 4 | 3.5 | 4 | 4 | 4 | 4 | 2.5 | 2.5 |
| $Na_2O$ | 19 | 19 | 19 | 17.5 | 18 | 18 | 17.5 | 19.6 |
| $K_2O$ | 2 | 2 | 2 | 2 | 2 | 2 | 2 | 1.9 |
| $B_2O_3$ | 5.5 | 4.5 | 4 | 7 | 5.5 | 6.5 | 7 | 4.6 |
| TOTAL | 100 | 100 | 100 | 100 | 100 | 100 | 100 | 99.80 |
| $T_{log3}$ | 910 | 925 | 925 | 915 | 930 | 910 | 925 | 1003 |
| $T_{liq}$ | — | — | — | — | — | — | — | 890 |
| $\alpha$ | $107 \times 10^{-7}$ | $107 \times 10^{-7}$ | $107 \times 10^{-7}$ | $100 \times 10^{-7}$ | $104 \times 10^{-7}$ | $103 \times 10^{-7}$ | $100 \times 10^{-7}$ | $110 \times 10^{-7}$ |

TABLE 3

| COMPOSITION "C" | | | | | | |
|---|---|---|---|---|---|---|
| | EX. 1C | EX. 2C | EX. 3C | EX. 4C | EX. 5C | EX. 6C |
| $SiO_2$ | 58 | 58.5 | 61 | 57.81 | 59 | 62.15 |
| $Al_2O_3$ | 1 | 0.5 | 0.5 | 0.65 | 0.5 | 0.04 |
| CaO | 7 | 7 | 7 | 7.95 | 7 | 10.7 |
| MgO | 5 | 5 | 3.5 | 3.4 | 4.5 | 0.9 |
| $Na_2O$ | 14 | 14 | 14 | 17.9 | 14 | 13.75 |
| $K_2O$ | 0 | 0 | 0 | 0.02 | 0 | 0.02 |
| $B_2O_3$ | 15 | 15 | 14 | 11.9 | 15 | 12.15 |
| BaO | 0 | 0 | 0 | 0 | 0 | 0 |

TABLE 3-continued

| | | | | | | |
|---|---|---|---|---|---|---|
| $P_2O_5$ | 0 | 0 | 0 | 0 | 0 | 0 |
| TOTAL | 100 | 100 | 100 | 99.63 | 100 | 99.71 |
| $T_{log3}$ | 956 | 956 | 983 | 929 | 960 | 989 |
| $T_{liq}$ | — | — | — | 870 | — | 940 |
| α | $80 \times 10^{-7}$ | $80 \times 10^{-7}$ | $80 \times 10^{-7}$ | $98 \times 10^{-7}$ | $78 \times 10^{-7}$ | $85 \times 10^{-7}$ |

| | COMPOSITION "C" | | | | | |
|---|---|---|---|---|---|---|
| | EX. 7C | EX. 8C | EX. 9C | EX. 10C | EX. 11C | EX. 12C |
| $SiO_2$ | 58 | 60.5 | 52 | 55.2 | 53 | 55 |
| $Al_2O_3$ | 1 | 1.5 | 2 | 1.35 | 1 | 1 |
| CaO | 7 | 7 | 8 | 7.6 | 10 | 9 |
| MgO | 4 | 3.5 | 7 | 3.1 | 7 | 7 |
| $Na_2O$ | 15 | 15.5 | 15 | 17.85 | 15 | 15 |
| $K_2O$ | 0 | 0 | 2 | 0.s | 1 | 2 |
| $B_2O_3$ | 15 | 12 | 12 | 12.2 | 12 | 11 |
| BaO | 0 | 0 | 0 | 2.35 | 0 | 0 |
| $P_2O_5$ | 0 | 0 | 2 | 0 | 1 | 0 |
| TOTAL | 100 | 100 | 100 | 100.15 | 100 | 100 |
| $T_{log3}$ | 947 | 984 | 924 | 920 | 914 | 926 |
| $T_{liq}$ | — | — | — | 850 | — | — |
| α | $83 \times 10^{-7}$ | $87 \times 10^{-7}$ | $90 \times 10^{-7}$ | $99 \times 10^{-7}$ | $90 \times 10^{-7}$ | $90 \times 10^{-7}$ |

TABLE 4

| | COMPOSITION "D" | | | | | | |
|---|---|---|---|---|---|---|---|
| | EX. 1D | EX. 2D | EX. 3D | EX. 4D | EX. 5D | EX. 6D | EX. 7D |
| $SiO_2$ | 56.32 | 57.5 | 59 | 59 | 58.5 | 57 | 59 |
| $Al_2O_3$ | 2.7 | 1 | 0.5 | 1 | 1 | 2.5 | 1 |
| CaO | 8.4 | 8 | 8.5 | 9 | 9 | 9 | 9 |
| MgO | 3.4 | 4 | 5 | 3.5 | 4 | 4 | 3.5 |
| $Na_2O$ | 9.7 | 11.5 | 12 | 10.5 | 10.5 | 11.5 | 11 |
| $K_2O$ | 0.02 | 0 | 0 | 0 | 0 | 0 | 0 |
| $B_2O_3$ | 19.29 | 18 | 15 | 17 | 17 | 16 | 16.5 |
| $P_2O_5$ | 0 | 0 | 0 | 0 | 0 | 0 | 0 |
| TOTAL | 99.83 | 100 | 100 | 100 | 100 | 100 | 100 |
| $T_{log3}$ | 1004 | 955 | 973 | 979 | 975 | 971 | 977 |
| $T_{liq}$ | 970 | — | — | — | — | — | — |
| α | $70 \times 10^{-7}$ | $72 \times 10^{-7}$ | $75 \times 10^{-7}$ | $70 \times 10^{-7}$ | $70 \times 10^{-7}$ | $75 \times 10^{-7}$ | $72 \times 10^{-7}$ |

| | COMPOSITION "D" | | | | | |
|---|---|---|---|---|---|---|
| | EX. 8D | EX. 9D | EX. 10D | EX. 11D | EX. 12D | EX. 13D |
| $SiO_2$ | 59 | 59 | 57 | 55.5 | 53.5 | 55 |
| $Al_2O_3$ | 1 | 1 | 2.5 | 0.5 | 0.5 | 1 |
| CaO | 8 | 9 | 9 | 8 | 9 | 8 |
| MgO | 4 | 4 | 4 | 8 | 8 | 7 |
| $Na_2O$ | 11 | 11.5 | 11.5 | 9 | 9 | 10 |
| $K_2O$ | 0 | 0 | 0 | 0 | 0 | 0 |
| $B_2O_3$ | 17 | 15.5 | 16 | 19 | 19 | 19 |
| $P_2O_5$ | 0 | 0 | 0 | 0 | 1 | 0 |
| TOTAL | 100 | 100 | 100 | 100 | 100 | 100 |
| $T_{log3}$ | 977 | 978 | 971 | 949 | 938 | 941 |
| $T_{liq}$ | — | — | — | — | — | — |
| α | $70 \times 10^{-7}$ | $74 \times 10^{-7}$ | $75 \times 10^{-7}$ | $62 \times 10^{-7}$ | $64 \times 10^{-7}$ | $66 \times 10^{-7}$ |

The compositions of a given type are next combined with compositions of another type so as to conform to the conditions of the invention in terms of $Na_2O$ and of $B_2O_3$ contents and of coefficient α. The most advantageous combinations are those which combine compositions of type A with compositions of type C (combination "A+C"), Compositions of type B with compositions of type D (combinations "B+D"), and compositions of type A with compositions of type D ("combinations "A+D"). These are, in fact, the combinations which make it possible to ensure the most significant differences in coefficient α, combined with the smallest differences in $T_{log3}$ It is thus possible to obtain wavy fibres without being "at the limit" both in terms of difference in thermal expansion and in compatibility of fibre-forming.

Nevertheless, by carefully choosing the compositions, it is possible to combine compositions of type A and B or compositions of type C and D.

It is found that it is also possible to form combinations with compositions belonging to different classes but nevertheless having $T_{log3}$ values which are sufficiently close.

Thus:

from Table 1 it is seen that the compositions according to class A can exhibit $T_{log3}$ values ranging between 800° and 990° C., from Table 2 it is seen that the compositions according to class B can exhibit $T_{log3}$ values ranging between 890° C. and 950° C., with even one example at approximately 1000° C., from Table 3 it is seen that the compositions according to class C can exhibit $T_{log3}$ values ranging between 900 and 990° C., and, finally, from Table 4 it is seen that the compositions according to class D can exhibit $T_{log3}$ values which are generally between 920° C. and 980° C., with even a value of approximately 1000° C. in the case of Example 1 D. (These ranges of $T_{log3}$ are given merely by way of indication and without limiting any of the classes).

Table 5 below proposes the most advantageous combinations, by indicating for each one the values of Δ $Na_2O$, Δ $B_2O_3$, |Δ $Na_2O$−Δ $B_2O_3$| as weight percentages explained in detail at the beginning of the present text, as well as the values of Δα in $K^{-1}$ corresponding to the difference between the coefficients α of the composition "of higher α" and of the composition "of lower α" and the values of Δ $T_{log3}$ in degrees C, corresponding to the difference, in absolute values, between the $T_{log3}$ temperature of the composition "of higher α" and that of the composition "of lower α".

TABLE 5

|  | Δα | Δ $T_{log3}$ | Δ$Na_2O$ | Δ$B_2O_3$ | \|Δ$Na_2O$−Δ$B_2O_3$\| |
|---|---|---|---|---|---|
| "Combination A + C" | | | | | |
| EX. 1A + EX. 1C | 37 × 10$^{-7}$ | 19 | 7.9 | 9.2 | 1.3 |
| EX. 4A + EX. 4C | 33 × 10$^{-7}$ | 27 | 7.1 | 8.9 | 1.8 |
| EX. 5A + EX. 5C | 32 × 10$^{-7}$ | 18 | 5 | 10 | 5 |
| EX. 7A + EX. 7C | 40 × 10$^{-7}$ | 10 | 8 | 12 | 4 |
| EX. 10A + EX. 7C | 45 × 10$^{-7}$ | 4 | 7 | 15 | 8 |
| EX. 12A + EX. 4C | 39 × 10$^{-7}$ | 16 | 10 | 15 | 5 |
| EX. 14A + EX. 4C | 39 × 10$^{-7}$ | 6 | 7.1 | 11.9 | 4.8 |
| EX. 12A + EX. 9C | 47 × 10$^{-7}$ | 11 | 10 | 12 | 2 |
| "Combination B + D" | | | | | |
| Ex. 2B + EX. 2D | 35 × 10$^{-7}$ | 30 | 7.5 | 13.5 | 6 |
| EX. 8B + EX. 1D | 40 × 10$^{-7}$ | 1 | 9.9 | 14.69 | 4.79 |
| EX. 5B + EX. 12D | 40 × 10$^{-7}$ | 8 | 9 | 13.5 | 4.5 |
| "Combination A + D" | | | | | |
| EX. 6A + EX. 13D | 57 × 10$^{-7}$ | 7 | 13 | 16 | 3 |
| EX. 1A + EX. 12D | 53 × 10$^{-7}$ | 1 | 12.9 | 13.2 | 0.3 |
| EX. 10A + EX. 2D | 56 × 10$^{-7}$ | 1 | 10.5 | 18 | 7.5 |
| EX. 18A + EX. 11D | 58 × 10$^{-7}$ | 6 | 13 | 18 | 5 |
| EX. 5A + EX. 9D | 36 × 10$^{-7}$ | 0 | 7.5 | 10.5 | 3 |
| "Combination C + D" | | | | | |
| Ex. 4C + EX. 11D | 36 × 10$^{-7}$ | 20 | 8.9 | 7.1 | 1.8 |
| EX. 10C + EX. 12D | 35 × 10$^{-7}$ | 18 | 8.85 | 6.8 | 2.05 |
| "Combination A + B" | | | | | |
| EX. 8A + EX. 6B | 28 × 10$^{-7}$ | 21 | 7 | 2.5 | 4.5 |
| EX. 13A + EX. 4B | 38 × 10$^{-7}$ | 15 | 7.5 | 7 | 0.5 |

Of course, this table absolutely does not delimit all the possible combinations. It exemplifies compositions that make it possible to obtain wavy fibres without encountering particular difficulties during the fibre formation and without the raw materials needed for the compositions excessively overloading their overall production cost. It may also be noted that even the compositions of low coefficient α, which are those richest in $B_2O_3$, have $B_2O_3$ contents which remain, by weight, lower than 20%; and that even the compositions of highest coefficient α, which are those richest in $Na_2O$, have $Na_2O$ contents which remain at most 25%.

The invention has therefore made it possible to reconcile the preparation of mineral wool with very specific properties with conditions of manufacture which are acceptable industrially and economically.

We claim:

1. Two-component inorganic fibres conjointly formed from first and second inorganic compositions, each composition:

a) comprising silica, alkali metal oxides and alkaline earth metal oxides, and having less than a combined total of at most 1% by weight of titanium oxide, zinc oxide, barium oxide and lithium oxide;

b) has a minimum viscosity temperature, ($T_{log\ 3}$), of from 830 to 1010° C.;

c) has a difference between its minimum viscosity temperature and its liquidus temperature of at least 30° C.; wherein the compositions are different and:

d) the compositions have thermal expansion coefficients differing by at least 20×10$^{-7}$°$K^{-1}$;

e) the compositions comprise contents of boron oxide and sodium oxide in which the amount by weight of each of these components in the first composition differs from the corresponding amounts in the second composition by more than 2%;

f) one of the compositions comprises up to 8% by weight of potassium oxide;

g) one of the compositions is composition "C" which has a thermal expansion coefficient of from 76×10$^{-7}$°$k^{-1}$to 99×10$^{-7}$ °$K^{-1}$ and further comprises sodium oxide, boron oxide and optionally potassium oxide such that the proportions by weight of these components are as follows: from 9 to less than 15% by weight of boron oxide, 13 to 18% by weight of sodium oxide and the combined proportions of the three components is from 22 to 33% by weight; and h) the other composition is composition "A" which comprises sodium oxide and optionally boron oxide and potassium oxide, wherein boron oxide is present in an amount of from 0 to 7% weight percent.

2. Two-component inorganic fibres according to claim 1 in which the first and second compositions have differing sodium oxide contents, (Δ$Na_2O$), and boron oxide contents, (Δ$B_2O_3$), that obey the relationship Δ$Na_2O$−Δ$B_2O_3$ is at least zero but not more than 5.

3. Two-component inorganic fibres according to claim 1 in which at least one of the two components further comprises at least 0.5% by weight of alumina.

4. Two-component inorganic fibres according to claim 3 in which at least one of the two components further comprises at most 5% by weight of alumina.

5. Two-component inorganic fibres according to claim 1 in which at least one of the two components further comprises from 0 to 3% by weight of phosphorus pentoxide.

6. Two-component inorganic fibres according to claim 1 in which at least one of the two components further comprises from 0 to 3%, by weight of ferric oxide, expressed as total iron.

7. Two-component inorganic fibres according to claim 1 which Component "C" comprises silica, calcia and magnesia and optionally alumina and phosphorus pentoxide in the following proportions by weight:

| $SiO_2$ | 52–64% |
|---|---|
| $Na_2O$ | 13–18% |
| $K_2O$ | 0–2% |
| $B_2O_3$ | 10–less than 15% |

-continued

| | |
|---|---|
| Al$_2$O$_3$ | 0–4% |
| CaO | 4–10% |
| MgO | 1–6% |
| P$_2$O$_5$ | 0–3%. |

8. Two-component inorganic fibres according to claim 7 in which Component "C" comprises the following components in the proportions by weight indicated:

| | |
|---|---|
| SiO$_2$ | 55–63% |
| Na$_2$O | 14–18% |
| K$_2$O | 0–1% |
| B$_2$O$_3$ | 11–less than 15% |
| Al$_2$O$_3$ | 0.5–2.5% |
| CaO | 4–8% |
| MgO | 3–5% |
| P$_2$O$_5$ | 0–3%. |

9. Two-component inorganic fibres according to claim 7 in which composition "A" has a thermal expansion coefficient of from $110\times10^{-7}°K^{-1}$ to $140\times10^{-7}°K^{-1}$ and wherein sodium oxide is present in an amount of from 18–25% and the combined proportions of sodium oxide, boron oxide and potassium oxide and is from 18–33%.

10. Two-component inorganic fibres according to claim 9 in which Component "A" comprises silica, calcia and magnesia and optionally alumina, and phosphorus pentoxide in the following proportions by weight:

| | |
|---|---|
| SiO$_2$ | 46–62% |
| Na$_2$O | 18–25% |
| K$_2$O | 0–8% |
| B$_2$O$_3$ | 0–7% |
| Al$_2$O$_3$ | 0–12% |
| CaO | 6–13% |
| MgO | 0–5% |
| P$_2$O$_5$ | 0–3%. |

11. Two-component inorganic fibres according to claim 10 in which Component "C" comprises the following components in the proportions by weight indicated:

| | |
|---|---|
| SiO$_2$ | 48–60% |
| Na$_2$O | 19–25% |
| K$_2$O | 1–4% |
| B$_2$O$_3$ | 0–4% |
| Al$_2$O$_3$ | 0.5–5% |
| CaO | 7–12% |
| MgO | 0–3% |
| P$_2$O$_5$ | 0–3%. |

* * * * *